Figure 1:
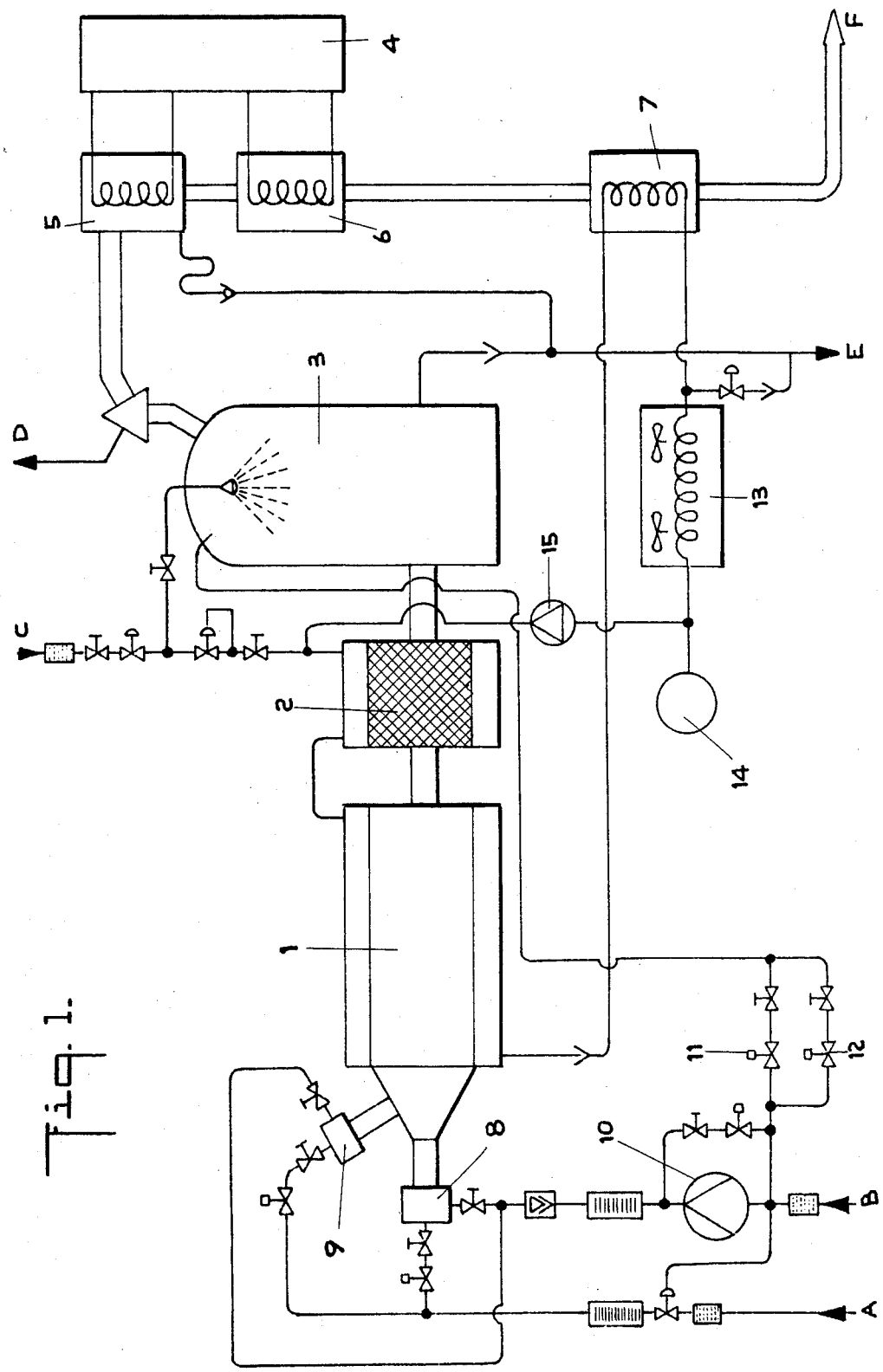

United States Patent [19]

Pruneri et al.

[11] Patent Number: 4,665,931

[45] Date of Patent: May 19, 1987

[54] METHOD OF PEST CONTROLLING TOBACCOS AND A SYSTEM FOR CARRYING OUT SAID METHOD

[75] Inventors: Dario Pruneri, Bolzano; Karl Zanon, Merano, both of Italy

[73] Assignee: Isolcell Europa S.r.l., Laives, Italy

[21] Appl. No.: 562,178

[22] Filed: Dec. 16, 1983

[30] Foreign Application Priority Data

Jan. 4, 1983 [IT] Italy ................. 19007 A/83

[51] Int. Cl.$^4$ ............................................. A24B 15/28
[52] U.S. Cl. ..................... 131/309; 131/300; 131/301; 131/302; 131/303
[58] Field of Search ........... 131/300, 309, 290; 99/283

[56] References Cited

U.S. PATENT DOCUMENTS 2,080,179  5/1937  Merriam et al. ............... 131/309

FOREIGN PATENT DOCUMENTS 1060306  8/1979  Canada ............................ 131/309

Primary Examiner—Vincent Millin
Attorney, Agent, or Firm—Amster, Rothstein & Ebenstein

[57] ABSTRACT

In order to pest control tobacco there is provided in a gas tight tobacco storage room an inert $O_2$ lacking atmosphere with $O_2$ between 0 and 5%, $CO_2$ between 1 and 20% and the balance $N_2$. This atmosphere is maintained until mortality of the pest. The system for providing this atmosphere includes essentially a generator, which can be a combustion chamber (1) associated with a catalytic chamber (2) (in the case of an open circuit system in which air is drawn from the atmosphere) or a catalytic chamber alone (in the case of a closed circuit system in which air is drawn from the tobacco storage room itself) and a cooling tower (3).

The system is generally provided also with an evaporator (5) and a condenser (6) to control the humidity of the inert atmosphere, and a heat exchanger (7) in which the combustion heat is utilized to heat the inert atmosphere at a temperature which speeds up the mortality of the pest.

9 Claims, 2 Drawing Figures

METHOD OF PEST CONTROLLING TOBACCOS AND A SYSTEM FOR CARRYING OUT SAID METHOD

The present invention relates to a method of pest controlling tobaccos and a system for carrying out said method.

Generally, for the pest control of tobaccos in leaves which are pressed in various types of packings it is customary to process tobacco with phosphin and methyl bromide in autoclave under vacuum. These methods are very dangerous, because of the dispersion of the above said poisons, for the personnel and anybody in the neighborhood. In some towns, for example, the pest control of the factories has been forbidden because of air pollution danger. Thus, there is a need for providing a method for eliminating tobacco pest without air pollution.

The tobacco pest which it is desired to eliminate is the tobacco woodworm (*Laspoderma serricorne*) and the tobacco moth (*Epmestia elutella*).

The method of pest controlling tobaccos according to the invention comprises the steps of providing an inert $O_2$ lacking atmosphere with $O_2$ between 0 and 5%, $CO_2$ between 1 and 20% and the balance $N_2$, exposing the tobacco to said atmosphere in a gas tight tobacco storage room and maintaining said atmosphere in the tobacco storage room until the full mortality of the tobacco pest.

It has been noted that by exposing the tobacco pest to said atmosphere a 100% mortality is obtained within 3-35 days depending on the temperature and relative humidity of the tobacco storage room.

This method lends itself to pest controlling tobacco in any form, either in leaves pressed in various types of packings or made up as a final product for the consumer, i.e. cigars, cigarettes, cut for pipe, etc. in market packets.

According to a feature of the present invention the inert atmosphere is heated to a temperature higher than the ambient temperature to reduce the mortality time of the pest and is maintained at that temperature.

At a temperature e.g. of 27° C. the mortality time is 10 days, which time lengthens in the case the temperature lowers.

The mortality is total for eggs, larvas, pupas and adults, i.e. for all the different stages of development of the pest.

The invention includes also a system for carrying out the method.

The system according to the invention is characterized in that it comprises an inert atmosphere generator having two inputs, the one connected to an air intake and the other to a combustion gas intake and a cooling tower also provided with two inputs, the one connected to the output of the inert atmosphere generator and the other to a cooling water intake, and further provided with two inputs, the one connected to a gas tight tobacco storage room and the other to a cooling water discharge.

Figure 2:
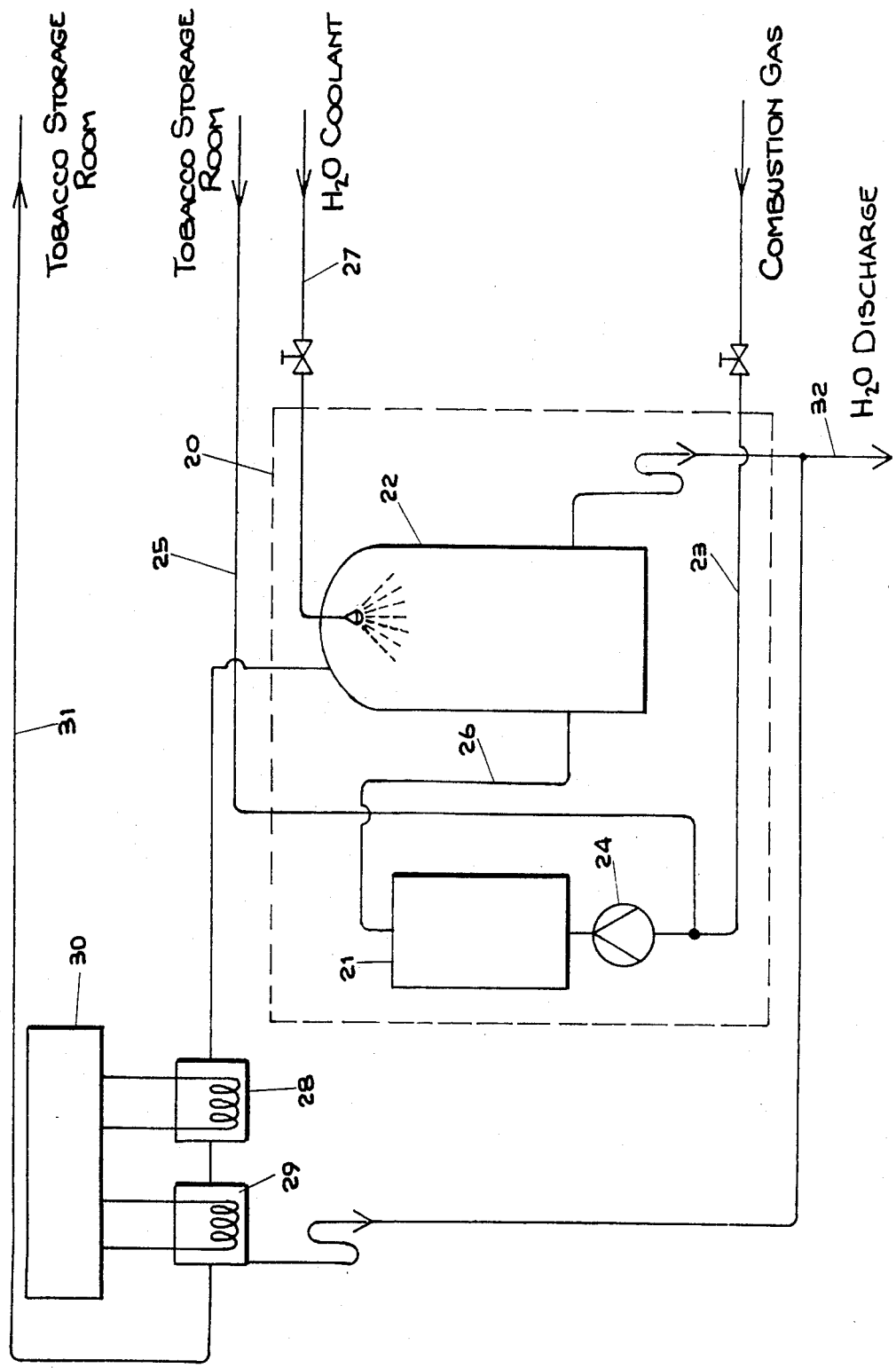

The invention will be better understood from the following detailed description, given merely as an example and therefore not in a limiting sense, of two embodiments thereof, with reference to the accompanying drawings, in which:

FIG. 1 is a diagram of a system for carrying out the method according to the invention; and FIG. 2 is a diagram of an alternative embodiment of the system according to the invention.

The difference between the two systems is that in the first one the desired atmosphere is obtained in an open circuit, whereas in the second one it is obtained in a closed circuit.

Referring first to FIG. 1, an isothermic generator comprises a combustion chamber 1 provided with two burners, a main burner 8 and a secondary burner 9, connected by means of conduits and valves on the one side to a combustion gas input referred to as A, and on the other side, through a fan 10, to an atmospheric air input referred to as B. The output of the combustion chamber 1 is connected to the input of a catalytic chamber 2 whose output is connected to the input of a cooling tower 3. An output of the cooling tower is connected, through an evaporator 5 and a condenser 6, which form part of a refrigeration system 4, as well as through a heat exchanger 7, to the tobacco storage room, not shown, the conduit leading to the storage room being referred to as F.

The cooling tower is also in connection with a cooling water input C, which water is then discharged at E.

The combustion chamber 1 and the catalytic chamber 2 are provided with a closed cooling circuit. The water heated in the combustion chamber 1 and the catalytic chamber 2, is supplied, through the pump 15, to the heat exchanger 7 and the heat exchanger 13 to exchange the heat previously absorbed in the combustion chamber 1 and the catalytic chamber 2. This circuit remains at a constant operation pressure in the case of lack of water or coolant supplied through the input C. In the case of overpressures the liquid is discharged in the discharge E through a safety device. D indicates the delivery outwards in the starting stage.

The system comprises finally two modulating valves 11, 12 inserted between the air intake B and an input of the cooling tower 3 controlled by a check or analysis system not shown.

The operation of the described system is as follows:

The combustion gas, propane or methane, or other combustible, e.g. gas oil, is taken from bottles or the supply line and caused to flow from A to the burners 8 and 9 at a predetermined pressure. Simultaneously, a predetermined air quantity is supplied continuously, by an electric fan 10, to the burners 8 and 9 of a special type in which the combustible gas or other combustible is mixed with air and then burnt in the combustion chamber 1 without leaving residual combustion products. In this operation air oxygen is lowered from 21% to 0.2-0.3%. The combustion products are thereafter cooled, e.g. to 500° C. by the cooling jacket af the combustion chamber 1. The inert gas thus obtained is caused to flow through the catalyst 2 where possible unburnt parts are converted to $CO_2$ and $H_2O$ without producing residual combustion products.

The gas flowing out from the catalyst is supplied to the cooling tower 3 where it cools to the desired temperature. It is then caused to flow in the conditioning system comprising the evaporator 5 and the condenser 6 to control the relative humidity of the produced atmosphere before introducing it in the tobacco storage room in order not to alter the absolute humidity of tobacco. Finally, the gas flows in the heat exchanger 7 where it is moderately heated to shorten the mortality time of the pest.

The storage room is suitably provided with an overpressure valve to balance the pressure developed upon introduction of the desired atmosphere.

The generator can have a variable flow rate so that once the desired concentrations of $O_2$, $CO_2$ and $N_2$ are achieved, they can be maintained with a reduced flow of the generated atmosphere so as to maintain the tobacco storage room at a pressure e.g. of 1–5 mm column of water and to prevent entry of air from outside, which reduces operating cost.

To this end, once the desired concentration is achieved, the main burner 8 is extinguished and only the secondary burner 9 is left operative which burns only the quantity of air-combustion gas mixture strictly necessary for maintaining a minimum desired pressure in the storage room.

The modulating valves 11 and 2 have the function to control the supply of combustible gas in dependence on the changes in the oxygen concentration in the inert atmosphere so as to maintain this oxygen concentration constant.

The generator has a combustion heat recovery device which is used for heating the air of the tobacco storage room undergoing the pest control. This device comprises the heat exchanger 13 in which there is caused to flow in closed circuit by the pump 15 the cooling water of the jackets of the catalytic chamber 2 and the combustion chamber 1 and which yield the heat removed from the two chambers in the pipe coil of the heat exchanger 7, to the inert atmosphere generated by the isothermic generator, and in the pipe coil of the heat exchanger 13 directly to the atmosphere of the tobacco storage room.

In FIG. 2 there is shown the diagram of a system according to the invention operating in a closed circuit.

The system comprises an oxygen converter 20 including a catalytic chamber 21 and a cooling tower 22. The catalytic chamber 21 has an input connected by means of a conduit 23 to a combustion gas source through a fan 24, upstream from which a conduit 25 connected to the gas tight tobacco storage room, not shown, is connected to the conduit 23. The cooling tower 22 has a first input connected by means of a conduit 26 to the output of the heated catalytic chamber 21 and a second input connected by means of a conduit 27 to a water refrigeration plant.

The cooling tower has a first output connected by means of a conduit 31, through an evaporator 28 and a condenser 29 which part of a refrigeration plant 20, to the tobacco storage room. A discharge conduit 32 collects water both from the condenser 29 and the cooling tower 22.

The system of FIG. 2 operates as follows:

Air drawn from the gas tight tobacco storage room enters the catalytic chamber 21, where by means of the introduction of a suitable quantity of combustible gas, a reduction of the oxygen at a temperature of 350° C. takes place. Assuming that the combustible gas is propane, the following reaction will take place:

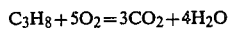

$$C_3H_8 + 5O_2 = 3CO_2 + 4H_2O$$

As is seen from the reaction, no CO or unburnt residues result.

The so generated inert atmosphere is supplied to the cooling tower 22 where it is cooled and flows thereafter in the evaporator 28 and the condenser 29 where their humidity is controlled and is supplied finally through the conduit 31 to the tobacco storage room.

By this system the $CO_2$ quantity in each flow through the converter is reduced until the desired asphyctic atmosphere is achieved.

The converter, once the atmosphere of the storage room has been brought to the desired rate, maintains the $O_2$ at the desired levels, by automatic in operation each time the $O_2$ level exceeds the predetermined level. More particularly, an analizer (not shown) analyzes the atmosphere of the tobacco storage room and when the oxygen percentage exceeds a predetermined value automatically operates the oxygen converter 20 which, as is seen, operates intermittently.

We claim:

1. A method of pest controlling tobaccos, characterized in that it comprises the steps of providing an oxygen-poor atmosphere with $O_2$ between 0 and 5%, $CO_2$ between 1 and 20% and the balance $N_2$, exposing the tobacco to said atmosphere in a gas tight tobacco storage room, and maintaining said atmosphere in the tobacco storage room for a period of 3 to 35 days.

2. A method as claimed in claim 1, characterized in that the oxygen-poor atmosphere is heated to a temperature higher than the ambient temperature and is maintained at said temperature.

3. An apparatus for the pest control of tobaccos, comprising an inert atmosphere generator having two inputs and an output, a first input being connected to an air supply and a second input being connected to a combustion gas or other combustible supply, and a cooling tower provided with two inputs, a first input being connected to the output of the inert atmosphere generator and a second input being connected to a cooling water supply the cooling tower also being provided with two outputs, one output being connected to a gas tight tobacco storage room and the other output being connected to a cooling water discharge.

4. An apparatus as claimed in claim 3, in which the inert atmosphere generator comprises a combustion chamber provided with at least one burner having an input connected to the atmosphere and another input connected to the second input to the inert atmosphere generator.

5. An apparatus as claimed in claim 4, in which a catalytic chamber is interposed between the output of the combustion chamber and the first input of the cooling tower.

6. An apparatus as claimed in claim 3, in which the inert atmosphere generator comprises an oxygen converter comprising a catalytic chamber having an input connected to the tobacco storage room and to a combustion gas supply.

7. An apparatus as claimed in in claim 3 including an evaporator and a condenser forming paert of a refrigeration unit interposed between the output of the cooling tower and the tobacco storage room.

8. An apparatus as claimed in claim 3 including a heat exchanger interposed between the output of the cooling tower and the tobacco storage room.

9. An apparatus as claimed in claim 3, in which the inert atmosphere generator comprises a main burner and a second burner to permit combustion with different air-combustion gas mixtures.

* * * * *